United States Patent
Shiino

[11] Patent Number: 6,163,566
[45] Date of Patent: Dec. 19, 2000

[54] SPREAD SPECTRUM TRANSMITTER, SPREAD SPECTRUM RECEIVER, AND SPREAD SPECTRUM COMMUNICATIONS SYSTEM

[75] Inventor: Haruhiro Shiino, Tokyo, Japan

[73] Assignee: Oki Electric Industry Co., Inc., Tokyo, Japan

[21] Appl. No.: 09/165,159

[22] Filed: Oct. 2, 1998

[30] Foreign Application Priority Data

Nov. 17, 1997 [JP] Japan ..................... 9-315573

[51] Int. Cl.⁷ .................. A61F 2/06; H04L 27/30
[52] U.S. Cl. ............ 375/143; 375/142; 375/146; 375/150; 375/152
[58] Field of Search .................... 375/130, 140, 375/141, 142, 143, 146, 147, 149, 150, 152

[56] References Cited

U.S. PATENT DOCUMENTS

| | | | |
|---|---|---|---|
| 4,225,935 | 9/1980 | Zscheile, Jr. et al. ............ | 708/253 |
| 5,166,951 | 11/1992 | Schilling . | |
| 5,228,055 | 7/1993 | Uchida et al. ............ | 375/142 |
| 5,291,515 | 3/1994 | Uchida et al. ............ | 375/142 |
| 5,467,367 | 11/1995 | Izumi et al. ............ | 375/142 |
| 5,583,884 | 12/1996 | Maruyama et al. ............ | 375/143 |
| 5,610,939 | 3/1997 | Takahashi et al. ............ | 375/150 |
| 5,748,668 | 5/1998 | Tomita et al. ............ | 375/130 |
| 5,751,705 | 5/1998 | Sato ............ | 370/335 |
| 5,793,798 | 8/1998 | Rudish et al. ............ | 375/260 |
| 5,799,010 | 8/1998 | Lomp et al. ............ | 370/335 |
| 5,881,099 | 3/1999 | Takahashi et al. ............ | 375/141 |

OTHER PUBLICATIONS

"Application Techniques for Spread Spectrum Communications Scheme" White Series No. 142, Triceps Co., Aug. 31, 1992.

*Primary Examiner*—Stephen Chin
*Assistant Examiner*—Lenny Jiang
*Attorney, Agent, or Firm*—Venable; Norman N. Kunitz

[57] ABSTRACT

A spread spectrum communications system is provided for reducing the number of required matched filters to simplify the configuration associated with the reception. In a spread spectrum transmitter, a plurality of spread channel signals are synthesized by shifting their respective phases by a time sufficiently shorter than one symbol period. In a spread spectrum receiver, a plurality of spread code sequences are set one by one at a tap of a single matched filter in one symbol period in a time division manner to recover transmitted data.

13 Claims, 7 Drawing Sheets

SPREAD SPECTRUM TRANSMITTER, SPREAD SPECTRUM RECEIVER, AND SPREAD SPECTRUM COMMUNICATIONS SYSTEM

BACKGROUND OF THE INVENTION

1. Field of the Invention

The present invention relates to spread spectrum communications systems, in particular, to spread spectrum transmitters and spread spectrum receivers which can be applied to mobile communications systems in accordance with a code division multiple access (CDMA) communications scheme for transmitting data, for example, having a transmission rate higher than that of one code channel using a plurality of codes.

2. Description of the Related Art

Reference is first made to the following documents related to the present invention:

(1) U.S. Pat. No. 5,166,951; and
(2) "Application Techniques for Spread Spectrum Communications Scheme" pp. 32–33 and pp. 53–59, published by Triceps Co., on Aug. 31, 1992.

The spread spectrum communications scheme utilizes spread codes such as pseudo random codes or the like to spread transmission data over a wider bandwidth than an original data bandwidth for transmission. Since the spread spectrum communications scheme has a variety of features including high resistance to interference, utilization of this scheme in mobile communications has been rapidly increased. The CDMA communications scheme is a multiple access scheme which applies the spread spectrum communications scheme as mentioned above to a mobile communications system. A mobile communications system in accordance with the CDMA communications scheme (hereinafter referred to as the "CDMA mobile communications system") can multiplex a large number of users (channels) in the same frequency band by employing spread codes for spreading data.

Also, for transmitting data having a data transmission rate higher than a rate per code channel defined by one spread code, a scheme for assigning a plurality of spread codes to a single user (hereinafter referred to as the "multi-code transmission scheme") has been proposed. As another method of transmitting high-speed data in a CDMA mobile communications system, there has also been proposed a method of transmitting data with a single spread code by reducing a processing gain. This method, however, has a drawback that a spread gain is reduced.

The multi-code transmission scheme has capabilities of transmitting data at a high data-rate without sacrificing the features of the spread spectrum, when high data-rate transmission is required with a fixed bandwidth, by utilizing a plurality of low data-rate channels having a large spread gain, instead of reducing the spread gain.

Operations involved in a transmitter in accordance with the conventional multi-code transmission scheme will be briefly described below (see FIG. 2 in the reference (1) cited above).

In the transmitter, input data d(t) is demultiplexed by a demultiplexer into a N(an integer) number of data d1 (t), . . . , dN(t), and these N number of data d1 (t), . . . dN(t) are multiplied by corresponding message chip codes g1(t), . . . , gN(t) in corresponding spread modulators (for example, EX-OR gates), respectively, to be spread. The respective message chip code g1(t), . . . , gN(t) are synchronized with a generic chip code g0(t). Then, the spread N number of signals and the generic chip code g0(t) are added in a combiner, and subsequently transmitted from an antenna through radio modulation processing and so on.

Operations involved in a receiver in accordance with the conventional multi-code transmission scheme will be briefly described below (see FIG. 3A in the reference (1) cited above).

In the receiver, from a received signal after being subjected to radio demodulation processing and so on, the synchronization of the generic chip code g0(t) is acquired and tracked. Next, the received signal is despread using message chip codes g1(t), . . . , gN(t) synchronized with the generic chip code g0(t) to produce data dR1(t), dR2(t), . . . , dRN(t) for respective channels. Finally, the respective channel data are multiplexed to recover the received data dR(t).

As described also in the reference (2) cited above, methods of acquiring and tracking the synchronization in a receiver may be generally classified roughly into a method utilizing a correlator and a method utilizing a matched filter.

In the method utilizing a correlator, a received signal is multiplied by a spread code, and a resulting product is integrated to produce a correlation value. Then, the synchronization is acquired and tracked on the basis of this correlation value. It should be noted that a receiver shown in the reference (1) cited above employs a configuration including a correlator.

In the method utilizing a matched filter, a received signal is input to a tapped delay line, which uses spread codes as weights of taps, to produce a correlation value, and the synchronization is acquired and tracked on the basis of this correlation value. A delay interval in the tapped delay line is selected to be chip intervals of the spread codes. Since the matched filter provides an output having a large value every spread code period (see FIG. 44 in the reference (2) cited above), the matched filter may be utilized as it is for demodulation (despread) of a received signal as well as for high speed synchronization and tracking of spread codes.

In recent years, more CDMA mobile communications systems have employed the method utilizing a matched filter than the method utilizing a correlator due to the advantages of the matched filter that has high speed synchronization and tracking capabilities and can be used as it is for demodulation (despread) of a received signal.

However, if a matched filter is utilized also for demodulation in a CDMA mobile communications system employing the multi-code transmission scheme, the system requires a plurality of matched filters because of a plurality of spread codes employed therein, thereby causing a problem that a hardware scale is increased.

In addition, even if the matched filter is not utilized for demodulation, the employment of a plurality of spread codes requires a plurality of demodulation processing systems, one for each spread code, thereby inevitably increasing the size of the receiver.

It should be noted that the problem as mentioned above has been found not only in CDMA mobile communications systems but also in one-to-one individual spread spectrum communications schemes employing the multi-code transmission scheme.

OBJECT AND SUMMARY OF THE INVENTION

It is an object of the present invention to provide a spread spectrum transmitter, a spread spectrum receiver, and a spread spectrum communications system which can simplify the configuration of a receiver.

To achieve the above object, the present invention provides, in a first aspect, a spread spectrum transmitter comprising (1) spread code generating means for generating a plurality of synchronized spread codes, (2) a plurality of spreading means each for spreading data directed thereto within a plurality of parallel input data with one of the spread codes supplied thereto to form a channel signal, (3) interchannel phase difference forming means for processing the plurality of channel signals such that the plurality of channel signals have phase differences in predetermined unit time increments, and (4) combining means for combining the plurality of channel signals having the phase differences to form a transmission path channel signal.

The present invention also provides, in a second aspect, a spread spectrum receiver comprising (1) spread code generating means capable of generating a plurality of spread codes, the spread code generating means selectively outputting the generated spread codes, (2) single matched filter means having a tap, wherein a spread code output from the spread code generating means is set at the tap, for outputting a correlation signal indicative of a correlation of a received transmission path channel signal with the spread code set at the tap, (3) control means for sequentially switching the plurality of spread codes and setting a spread code at the tap of the matched filter means, and (4) output means for recovering data transmitted from a corresponding spread spectrum transmitter, on the basis of the correlation signal output from the matched filter means.

Further, a spread spectrum communications system according to a third aspect of the present invention comprises the spread spectrum transmitter according to the first aspect of the present invention and the spread spectrum receiver according to the second aspect of the present invention.

DETAILED DESCRIPTION OF EMBODIMENTS (A) First Embodiment

A spread spectrum transmitter, a spread spectrum receiver, and a spread spectrum communications system according to a first embodiment of the present invention will hereinafter be described in detail with reference to the accompanying drawings. It should be noted that the first embodiment is intended to apply the present invention to a CDMA mobile communications system.

Figure 1:
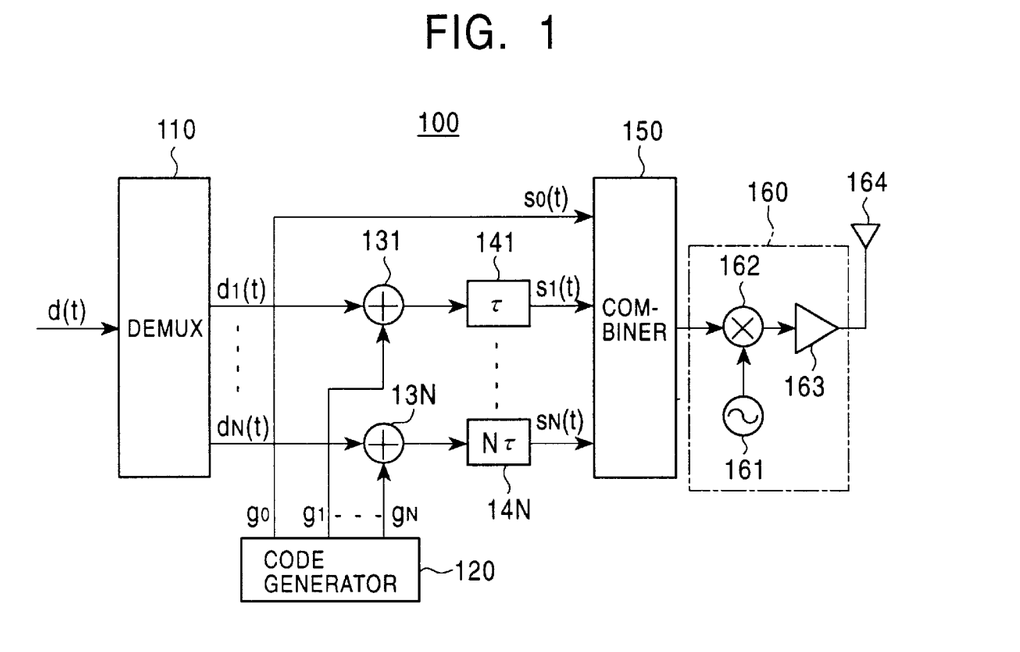
FIG. 1 is a block diagram illustrating the configuration of a spread spectrum transmitter according to a first embodiment of the present invention.

FIG. 1 illustrates the configuration of a transmitter (spread spectrum transmitter) 100 according to the first embodiment, which is installed both in a base station and in a mobile station.

Referring specifically to FIG. 1, the transmitter 100 comprises a demultiplexer (DEMUX) 110, a code generator 120 for parallelly generating N types of spread codes g1–gN, a N number of spreaders 131–13N, a N number of delay units 141–14N having different delay times in increments of a predetermined time $\tau$, a combiner 150, and an RF (radio frequency band) transmission unit 160. The RF transmission unit 160 in turn comprises a carrier oscillator 161, a multiplier 162, and a power amplifier 163.

Figure 2:
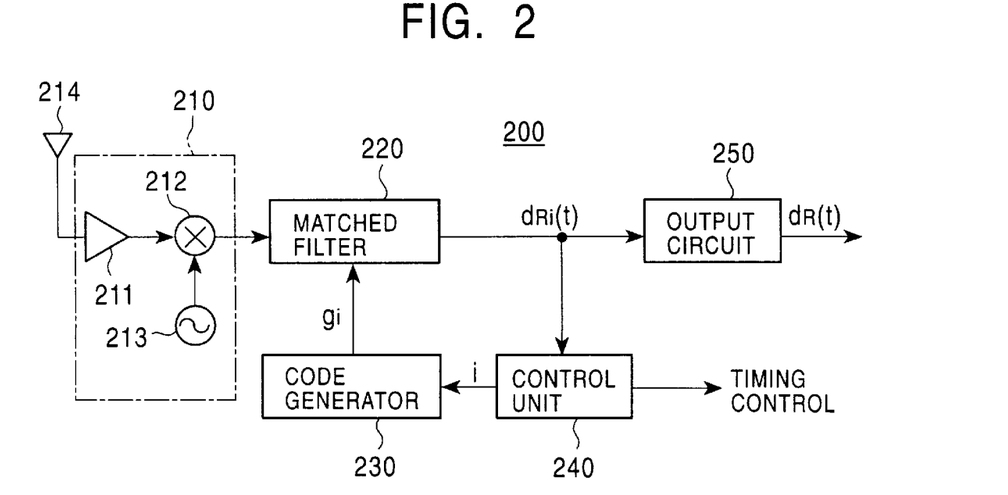
FIG. 2 is a block diagram illustrating the configuration of a spread spectrum receiver according to the first embodiment of the present invention.

FIG. 2 illustrates the configuration of a receiver (spread spectrum receiver) 200 according to the first embodiment, which is installed both in a base station and in a mobile station.

Referring specifically to FIG. 2, the receiver 200 comprises an RF reception unit 210, a matched filter 220, a code generator 230 for serially generating N types of spread codes g1–gN, a control unit 240, and an output circuit 250. The RF reception unit 210 in turn comprises an amplifier 211, a multiplier 212, and a carrier oscillator 223.

Figure 3:
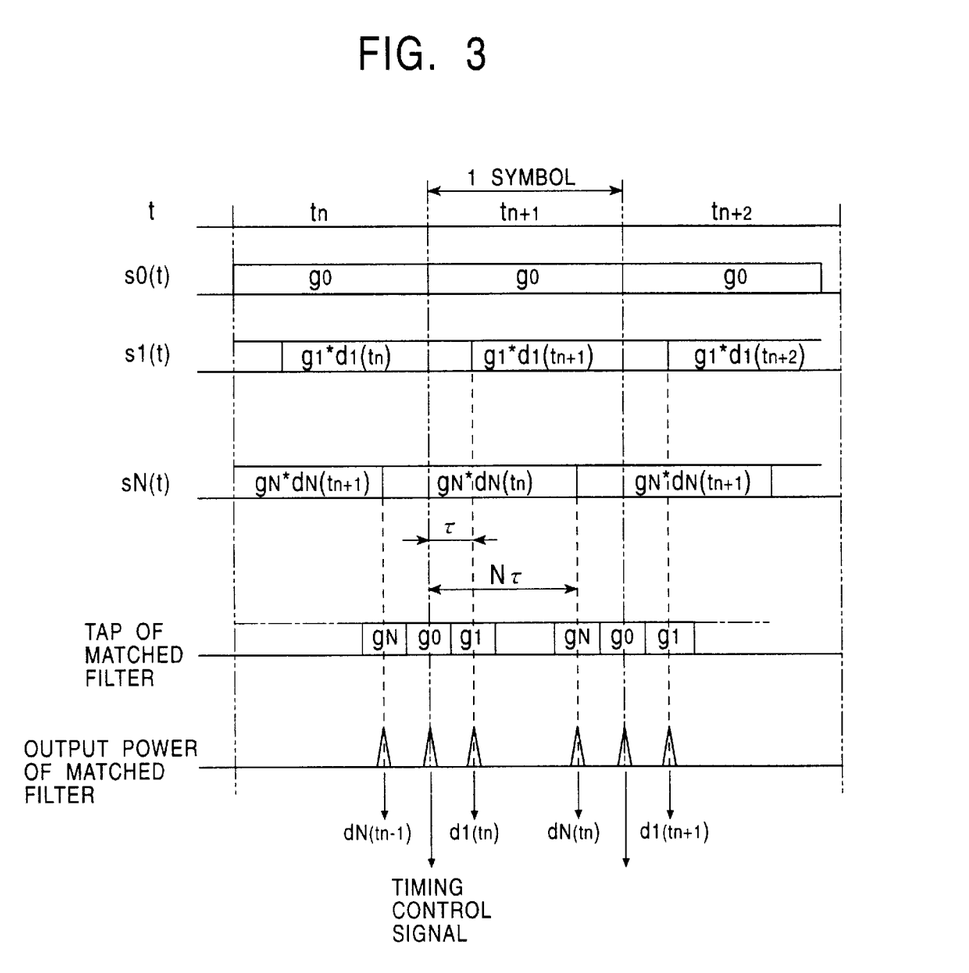
FIG. 3 shows timing charts representing various signals in the first embodiment.

FIG. 3 shows timing charts representing various signals in the transmitter 100 and the receiver 200.

In the following, the operation of the transmitter 100 according to the first embodiment will be described with reference to FIGS. 1 and 3.

Input data d(t) is demultiplexed into a N number of data sequences d1(t), . . . , dN(t) in the demultiplexer 110, and the demultiplexed N number of data sequences are parallelly input to the N number of spreaders 131–13N. Each of the spreaders 13x (x is any of 1–N) is applied with a spread code sequence gx of N number of spread code sequences g1, . . . , gN generated synchronously by the code generator 120. Each spreader 13x spreads an input data sequence dx(t) using the spread code sequence gx applied thereto.

A N number of spread channel signals output from the N number of spreaders 131–13N as described above are applied to the delay units 141, . . . , 14N corresponding to the spreaders 131, . . . , 13N, respectively. Each delay unit 14x has a delay time selected to be a time $x\tau$ which is x times the unit delay time $\tau$. The unit delay time $\tau$ is a predetermined value which is set such that a time $(N+1)\tau$ is equal to or shorter than a symbol time of a demultiplexed data sequence. Therefore, spread channel signals s1(t)–sN(t) output from the N number of delay units 141–14N have phases, which are respectively shifted by the N times of the unit delay time $\tau$ from a switching phase between symbols of a demultiplexed data sequence, as illustrated in FIG. 3. These delayed spread channel signals s1(t)–sN(t) are applied to the combiner 150.

The combiner 150 is also applied with a reference channel signal s0(t), as illustrated in FIG. 3, formed of a reference spread code sequence g0 output from the code generator 120, for defining the switching phase between symbols of a demultiplexed data sequence. Thus, the combiner 150 outputs a signal representative of the sum of the reference channel signal s0(t) and the N number of delayed spread channel signals s1(t)–sN(t).

In the RF transmission unit 160, the multiplier 162 multiplies the output signal from the combiner 150 by a carrier from the carrier oscillator 161 for up-conversion to a signal in an RF band. The up-converted signal is then power-amplified by the power amplifier 163 and radiated from an antenna 164 to a radio transmission path (radio channel).

Next, the operation of the receiver 200 according to the first embodiment will be described while referring to FIGS. 2 and 3.

In FIG. 2, a received signal captured by an antenna 214 is applied to the RF reception unit 210. In the RF reception unit 210, the received signal is amplified by the amplifier 211 and then multiplied by a carrier from the carrier oscillator 213 in the multiplier 212 to be down-converted to a signal in a processing frequency band which is then applied to the matched filter 220.

The control unit 240 first resets a code sequence type parameter i (i is any of 0–N) to "0" to cause the code generator 230 to output the reference spread code sequence g0 and set the same at a tap of the matched filter 220, and monitors an output signal from the matched filter 220. As illustrated in FIG. 3, the power of the output signal from the matched filter 220 becomes larger at the time the received signal including one symbol-period portion from the first code of the reference spread code sequence go as a component is latched into a shift register within the matched filter 220. When the power of the output signal from the matched filter 220 exceeds a threshold value, i.e., if a correlation between the received signal and the reference spread code sequence g0 is detected in a state where the reference spread code sequence g0 is set at the tap of the matched filter 220, the control unit 240 generates a timing signal to notify processing stages at and after the output circuit 250 of the beginning of a new symbol period (a symbol period in terms of demultiplexed data).

Simultaneously, the control unit 240 also sets the code sequence type parameter i to "1" to cause the code generator 230 to output the spread code sequence g1 and set the same at the tap of the matched filter 220, and monitors an output signal from the matched filter 220. As illustrated in FIG. 3, the power of the output signal from the matched filter 220 becomes larger at the time a received signal including one symbol-period portion of the spread channel signal $s1(t)=g1*d1(t)$, spread by the spread code sequence g1, as a component is latched into the shift register within the matched filter 220. At this time, a positive correlation or a negative correlation has been changed depending on whether a symbol $d1(t)$ is "1" or "0." Specifically, a correlation value $dR1(t)$ at the time the power is large takes a value corresponding to the positive correlation or the negative correlation (and hence "1" or "0" of the symbol $d1(t)$).

When the correlation between the received signal and the spread code sequence g1 is detected as described above, the control unit 240 sets the code sequence type parameter i to "2" to cause the code generator 230 to output the spread code sequence g2 and set the same at the tap of the matched filter 220, and monitors an output signal from the matched filter 220. Also, in this event, the power of the output signal from the matched filter 220 becomes larger, as illustrated in FIG. 3, at the timing a received signal including one symbol-period portion of a spread channel signal $s2(t)=g2*d2(t)$, spread by the spread code sequence g2, as a component is latched into the shift register within the matched filter 220.

Afterwards, the control unit 240 similarly switches the spread code sequence output from the code generator 230 and set them at the tap of the matched filter 220 sequentially in the order of the spread code sequences g3–gN each time a correlation is detected in the output signal of the matched filter 220. Also, when a correlation is detected under the condition that a spread code sequence gN is set at the tap of the matched filter 220, the control unit 240 again sets the reference spread code sequence g0 at the tap of the matched filter 220, and repeats the foregoing operations.

By the processing in the transmitter 100 described above, the respective spread channel signals $s1(t), \ldots, sN(t)$ have the phases different from each other by the unit delay time $\tau$. A correlation can be detected in the output signal of the matched filter 220 at time intervals of $\tau$ so that the controller 240 may switch the spread code sequences to be set at the tap of the matched filter sequentially at time intervals of $\tau$ without monitoring the output signal of the matched filter 220, once a correlation is detected with respect to the reference spread code sequence go.

Under the control of the control unit 240 as described above, the matched filter 220 delivers an output signal having correlation values $dR1(t), dR2(t), \ldots, dRN(t)$, each having discretely large power, substantially at time intervals of $\tau$ and applies them to the output circuit 250.

As described above, the correlation values $dR1(t), dR2(t), \ldots, dRN(t)$, when they have large power, correspond to the symbol values $d1(t), d2(t), \ldots, dN(t)$ in each spread channel signal, so that the output circuit 250 generates received data $dR(t)=d(t)$ from a time series of the correlation values $dR1(t), dR2(t), \ldots, dRN(t)$, and outputs the received data.

As described above, according to the first embodiment, a plurality of spread channel signals are synthesized with their phase shifted from each other by a time sufficiently shorter than one symbol period on the transmitter side, while a plurality of spread code sequences are set at a tap of a single matched filter within one symbol period in a time-division manner to recover transmitted data on the receiver side, thereby making it possible to largely reduce the number of required matched filters, as compared with the prior art, and to eliminate a multiplexer on the receiver side. Consequently, the configuration of the receiver can be significantly simplified.

(B) Second Embodiment

Next, a spread spectrum transmitter, a spread spectrum receiver and a spread spectrum communications system according to a second embodiment of the present invention will be described in detail while referring to the accompanying drawings. The second embodiment is also intended to apply the present invention to a CDMA mobile communications system.

Figure 4:
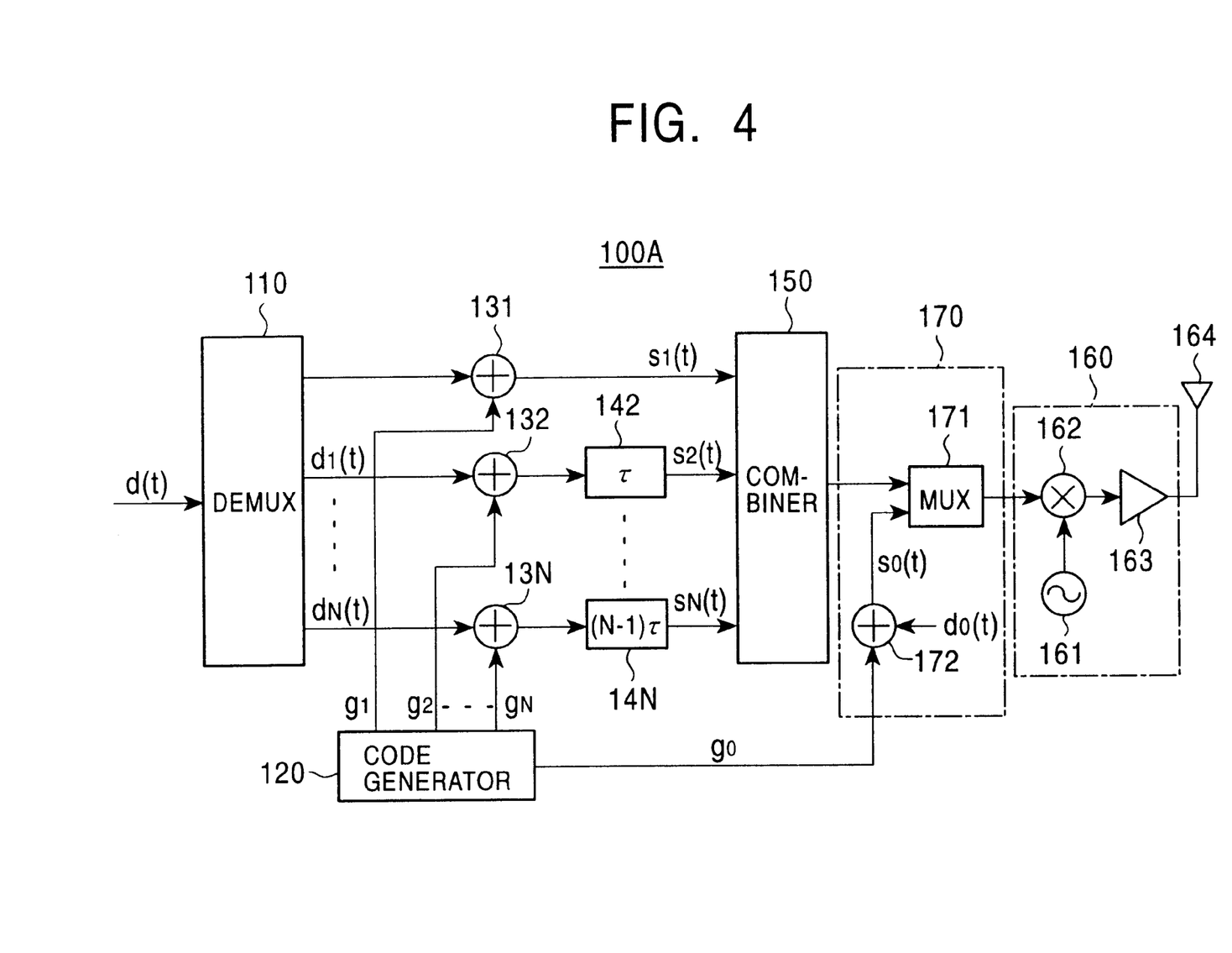
FIG. 4 is a block diagram illustrating the configuration of a transmitter according to a second embodiment.

FIG. 4 illustrates the configuration of a transmitter (spread spectrum transmitter) 100A according to the second embodiment, which is installed both in a base station and in a mobile station. It should be noted that in FIG. 4, parts identical or corresponding to those in the aforementioned transmitter 100 of the first embodiment illustrated in FIG. 1 are designated with the same reference numerals.

As is apparent from a comparison between FIG. 4 and FIG. 1, the transmitter 100A of the second embodiment further comprises a reference signal adder 170 between the combiner 150 and the RF transmission unit 160, in addition to the configuration of the first embodiment. The reference signal adder 170 in turn comprises a multiplexer 171 and a spreader 172. Unlike the first embodiment, a reference spread code sequence g0 output from the code generator 120 is applied to the reference signal adder 170, instead of being applied to the combiner 150. Also, unlike the first embodiment, N–1 delay circuits 142–14N are disposed as a group of delay circuits for providing a N number of spread channel signals with phase differences in increments of the time $\tau$.

A receiver (spread spectrum receiver) corresponding to the transmitter 100A of the second embodiment having the configuration as described above may also be represented by FIG. 2 related to the aforementioned first embodiment, when represented in a block diagram form. However, the second embodiment differs from the first embodiment in the control operations performed by the control unit 240. Therefore, the operation of the receiver of the second embodiment, will be described later while referring to FIG. 2.

The operation of the transmitter 100A according to the second embodiment will be described while referring to FIG. 4.

Input data d(t) is demultiplexed into a N number of data sequences d1(t), . . . , dN(t) in the demultiplexer 110, and the N number of data sequences are parallelly input to the N number of spreaders 131–13N. Each of the spreaders 13x (x is any of 1–N) is applied with one spread code sequence gx out of the N number of spread code sequences g1, . . . , gN generated synchronously by the code generator 120. Each spreader 13x spreads an input data sequence dx(t) using the spread code sequence gx applied thereto.

Within the N number of spread channel signals output from the N number of spreaders 131–13N, the spread channel signal output from the spreader 131 is directly applied to the combiner 150, while the remaining N−1 spread channel signals are applied to the combiner 150 after they are passed through delay units 142, . . . , 14N corresponding to the spreaders 132, . . . , 13N and thus delayed by respective predetermined delay times. A delay time provided by each delay unit 14y (y is any of 2–N) is selected to be a time (y−1)τ which is (y−1) times the unit delay time τ. Also, in the second embodiment, the unit delay time τ is a predetermined value which is set such that a time Nτ is equal to or shorter than one symbol time of a demultiplexed data sequence.

Thus, the N number of spread channel signals s1(t)–sN(t) parallelly input to the combiner 150 have the different phases in increments of the unit delay time τ from a switching phase between symbols of a multiplexed data sequence. The combiner 150 adds these N number of spread channel signals s1(t)–sN(t) and outputs a data signal indicative of the sum to the reference signal adder 170.

In the reference signal adder 170, the following processing is performed. First, in the spreader 172, a reference data sequence d0(t) formed of one bit or a plurality of bits intended, for example, to acquire the synchronization is spread using a reference spread code sequence g0 output from the code generator 120, and output to the multiplexer 171 as a reference signal s0(t). In the multiplexer 171, the reference signal s0(t) is time multiplexed with the data signal from the combiner 150. The reference signal s0(t) is positioned before the data signal from the combiner 150 on the time base. The reference data d0(t) may be a sequence previously defined by the system or a sequence which partially includes a data.

In the RF transmission unit 160, the multiplier 162 multiplies an output signal from the reference signal adder 170 by a carrier from the carrier oscillator 161 for up-conversion to a signal in an RF band. The up-converted signal is then power-amplified by the power amplifier 163 and radiated from the antenna 164 to a radio transmission path (radio channel).

Next, the operation of the receiver 200 according to the second embodiment, corresponding to the transmitter 100A, will be described while referring to FIG. 2.

In FIG. 2, a received signal captured by the antenna 241 is applied to the RF reception unit 210. In the RF reception unit 210, the received signal is amplified by the amplifier 211, and then multiplied by a carrier from the carrier oscillator 213 by the multiplier 212 to be down-converted to a signal in a processing frequency band, and applied to the matched filter 220.

The controller 240 first detects the time-multiplexed reference signal s0(t). For this purpose, the control unit 240 sets the code sequence type parameter i (i is any of 0–N) to "0" to cause the code generator 230 to output the reference spread code sequence g0 and set the same at the tap of the matched filter 220, and monitors an output signal from the matched filter 220. When the control unit 240 detects the incoming reference signal s0(t) based on the output signal from the matched filter 220, the control unit 240 generates and outputs a timing control signal to the succeeding unit, and proceeds to data signal detection processing.

In case the reference data sequence d0(t) is formed of one bit, the reference signal s0(t) is assumed to be detected by the control unit 240 at the time the power of the output signal from the matched filter 220 exceeds a threshold value, i.e., when a correlation between the received signal and the reference spread code sequence g0 is detected, in a state where the reference spread code sequence g0 is set at the tap of the matched filter 220. On the other hand, in case the reference data sequence d0(t) is formed of a plurality of bits, the reference signal s0(t) is assumed to be detected by the control unit 240 at the time the pattern of the output signal from the matched filter 220, derived when the power from the matched filter 220 exceeds a threshold value, matches the pattern of the reference data sequence d0(t), in a state where the reference spread code sequence g0 is set at the tap of the matched filter 220.

Proceeding to a data signal detecting stage, the control unit 240 first sets the code sequence type parameter i to "1" to cause the code generator 230 to output the spread code sequence g1 and set the same at the tap of the matched filter 220, and monitors an output signal from the matched filter 220. At a time a received signal including one symbol period of the spread channel signal s1(t)=g1*d1(t), spread by the spread code sequence g1, as a component is latched into the shift register within the matched filter 220, the power of the output signal from the matched filter 220 becomes large.

When a correlation between the received signal and the spread code sequence g1 is detected as described above, the control unit 240 sets the code sequence type parameter i to "2" to cause the code generator 230 to output the spread code sequence g2 and set the same at the tap of the matched filter 220, and monitors the output signal from the matched filter 220. Also, in this event, the power of the output signal from the matched filter 220 becomes large at the timing a received signal including one symbol period portion of the spread channel signal s2(t)=g2*d2(t), spread by the spread code sequence g2, as a component is latched into the shift register within the matched filter 220.

Afterwards, the control unit 240 similarly switches spread code sequences output from the code generator 230 and set them at the tap of the matched filter 220 sequentially in the order of the spread code sequences g3–gN each time a correlation is detected in the output signal of the matched filter 220. Also, when a correlation is detected with a spread code sequence gN set at the tap of the matched filter 220, the control unit 240 again sets the spread code sequence g1 at the tap of the matched filter 220, and repeats the foregoing operations.

Under the control of the control unit 240 as described above, the matched filter 220 delivers an output signal having correlation values dR1(t), dR2(t), . . . , dRN(t), each having discretely large power, substantially at time intervals of τ and applies them to the output circuit 250.

As described above, the correlation values dR1(t), dR2(t), . . . , dRN(t), when they have large power, correspond to symbol values d1(t), d2(t), . . . , dN(t) in each spread channel signal, so that the output circuit 250 generates received data dR(t)=d(t) from a time series of the correlation values dR1(t), dR2(t), . . . , dRN(t), to output the received data.

According to the foregoing second embodiment, similarly to the first embodiment, a plurality of spread channel signals are synthesized with their phase shifted from each other by a time sufficiently shorter than one symbol period on the transmitter side, while a plurality of spread code sequences are set at a tap of a single matched filter within one symbol period in a time-division manner to recover transmitted data on the receiver side, thereby making it possible to largely reduce the number of required matched filters, as compared with the prior art, and to eliminate a multiplexer on the receiver side. Consequently, the configuration of the receiver can be significantly simplified.

In addition, according to the second embodiment, since the reference signal and the data signal are time-multiplexed, the output circuit 250 is not applied with a correlation output signal related to the reference signal at a data signal processing stage on the receiver side, thereby making it possible to highly accurately carry out the generation of the received data dR(t)=d(t).

It will be further noted that the second embodiment is suitable for the transmission of burst data, since the reference signal and the data signal are time-multiplexed.

(C) Third Embodiment

Figure 5:
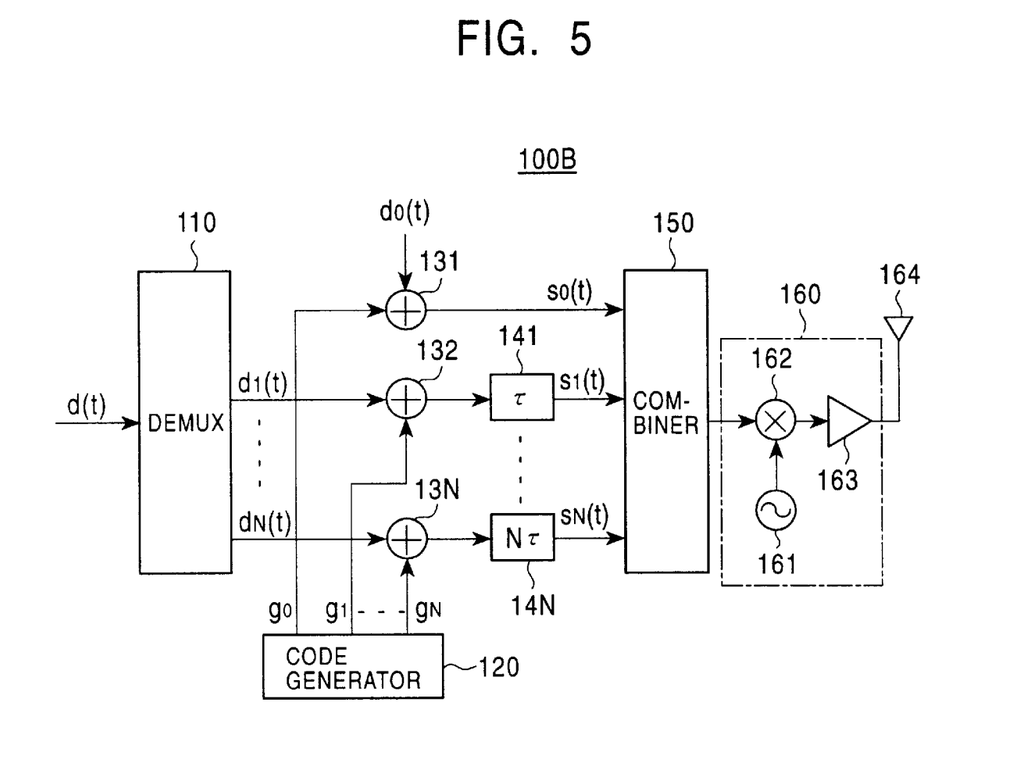
FIG. 5 is a block diagram illustrating the configuration of a transmitter according to a third embodiment.

FIG. 5 illustrates the configuration of a transmitter (spread spectrum transmitter) 100B according to a third embodiment, which is installed both in a base station and in a mobile station. It should be noted that in FIG. 5, parts identical or corresponding to those in the aforementioned transmitter 100 of the first embodiment illustrated in FIG. 1 are designated with the same reference numerals.

In the first embodiment, the reference channel signal s0(t) is formed only of the reference spread code sequence go, whereas in the third embodiment, a signal generated by spreading reference data d0(t) with a reference spread code sequence g0 in a spreader 130 is used as a reference channel signal s0(t). The remaining aspects of the third embodiment are similar to the first embodiment, so that explanation thereof is omitted. In addition, the configuration of the receiver illustrated in FIG. 2 may be applied to the third embodiment.

The third embodiment can also have an advantage of simplifying the configuration of the receiver, as is the case of the first embodiment.

(D) Fourth Embodiment

Figure 6:
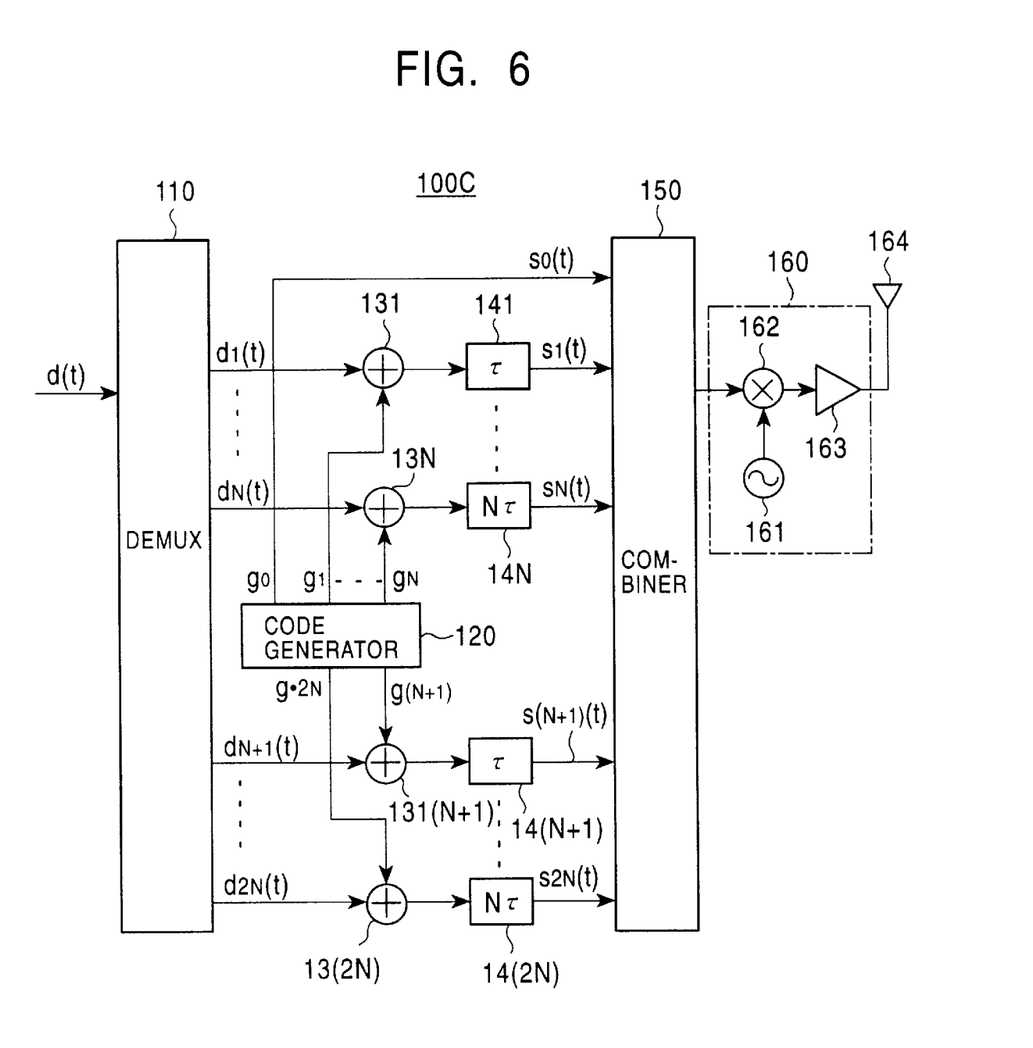
FIG. 6 is a block diagram illustrating the configuration of a transmitter according to a fourth embodiment.

FIG. 6 illustrates the configuration of a transmitter (spread spectrum transmitter) 100C according to a fourth embodiment, which is installed both in a base station and in a mobile station. It should be noted that in FIG. 6, parts identical or corresponding to those in the aforementioned transmitter 100 of the first embodiment illustrated in FIG. 1 are designated the same reference numerals.

Figure 7:
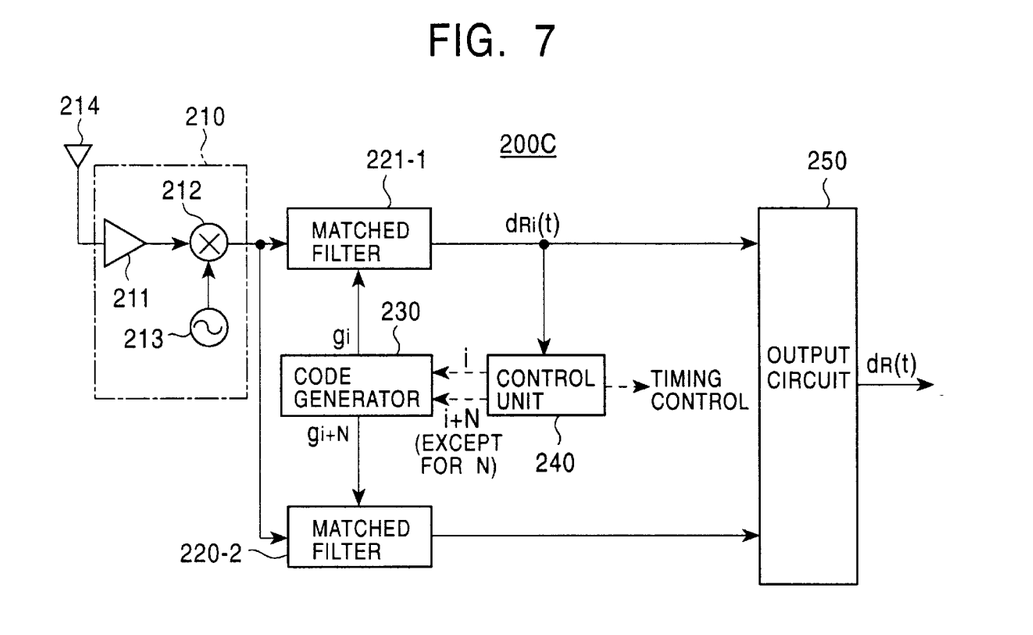
FIG. 7 is a block diagram illustrating the configuration of a receiver according to the fourth embodiment.

FIG. 7 in turn illustrates a receiver (spread spectrum receiver) 200C according to a fourth embodiment, which is also installed both in a base station and in a mobile station. In FIG. 7, parts identical or corresponding to those in the aforementioned receiver 200 of the first embodiment illustrated in FIG. 2 are designated with the same reference numerals.

The aforementioned first to third embodiments process a plurality of data sequences demultiplexed by the demultiplexer 110 as one group.

The fourth embodiment, conversely, processes a plurality of data sequences demultiplexed by the demultiplexer 110 separately in a plurality of groups. FIGS. 6 and 7 illustrate an example in which data is divided into two groups.

Although detailed description is avoided, features of the fourth embodiment may be described in brief as follows.

In the transmitter 100C, while a spread code sequence is required for each of the demultiplexed data sequences, a spread channel signal given the same delay time exists in each group.

The receiver 200C is provided with a number of matched filters 220-1, 220-2, equal to the number of groups, and each of the matched filters 220-1, 220-2 is sequentially applied with spread code sequence of a group assigned thereto so that the sequentially applied spread code sequences are sequentially set at its tap. The output circuit 250 recovers received data dR(t)=d(t) by multiplexing correlation value signals from all of the matched filters 220-1 and 220-2.

Although, in the fourth embodiment, a larger number of matched filters is required than the first to third embodiments, the configuration of the receiver can be simplified as compared with the prior art.

Even if, in the fourth embodiment, an input signal is demultiplexed into a large number of data sequences, a larger unit delay time τ can be allowed, so that an improved accuracy can be expected in the recovery at the receiver.

(E) Fifth Embodiment

Figure 8:
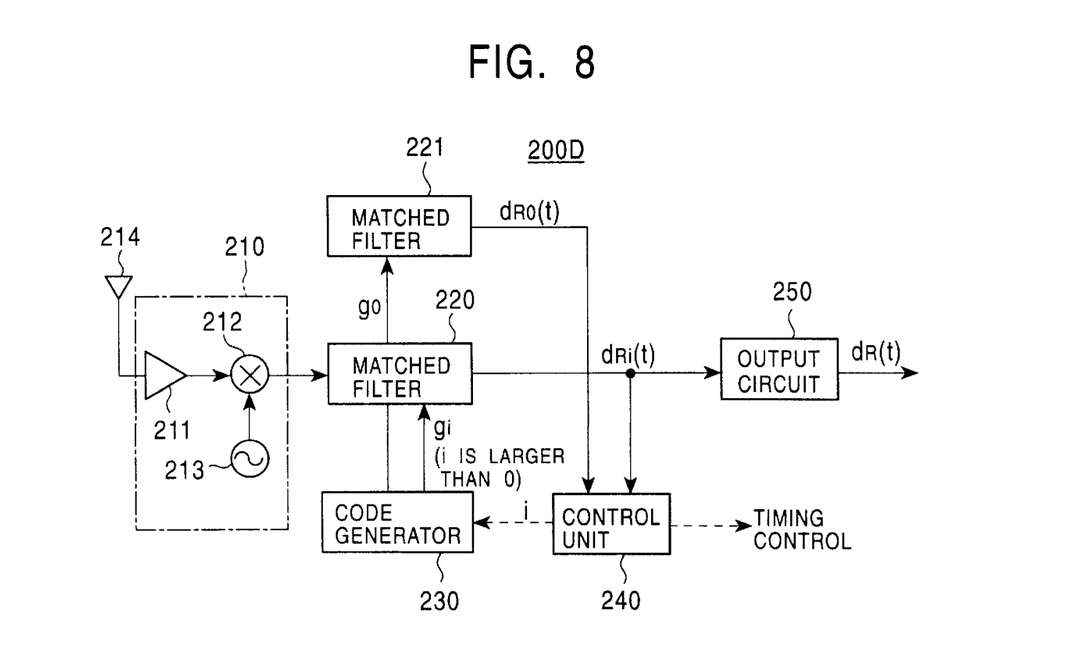
FIG. 8 is a block diagram illustrating the configuration of a receiver according to a fifth embodiment.

FIG. 8 illustrates the configuration of a receiver (spread spectrum receiver) 200D according to a fifth embodiment, which is installed both in a base station and in a mobile station. It should be noted that in FIG. 8, parts identical or corresponding to those in the aforementioned receiver 200 of the first embodiment illustrated in FIG. 2 are designated with the same reference numerals.

The receivers according to the aforementioned first to fourth embodiments utilize the matched filter 220 for processing channel signals related to data to also capture a reference channel signal, whereas the receiver 200D according to the fifth embodiment provides a matched filter 221 dedicated to a reference channel signal. The remaining aspects of the fifth embodiment are substantially similar to the first embodiment, so that explanation thereon is omitted. A transmitter, corresponding to the receiver 200D, is identical to any transmitter of the first to third embodiments.

The fifth embodiment can also have the advantage of simplifying the configuration of the receiver. In addition, according to the fifth embodiment, since any other spread code is not set to the matched filter to which the reference spread signal is set, it is expected that the reference channel signal can be more reliably acquired.

(F) Sixth Embodiment

Figure 9:
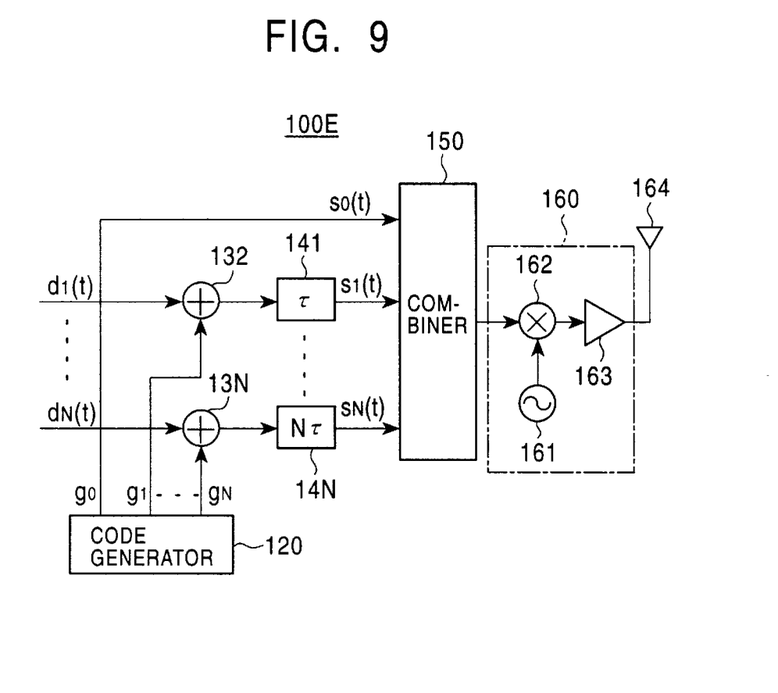
FIG. 9 is a block diagram illustrating the configuration of a transmitter according to a sixth embodiment.

FIG. 9 illustrates the configuration of a transmitter (spread spectrum transmitter) 100E according to a sixth embodiment, which is installed both in a base station and in a mobile station. It should be noted that in FIG. 9, parts identical or corresponding to those in the aforementioned transmitter of the first embodiment illustrated in FIG. 1 are designated with the same reference numerals.

Figure 10:
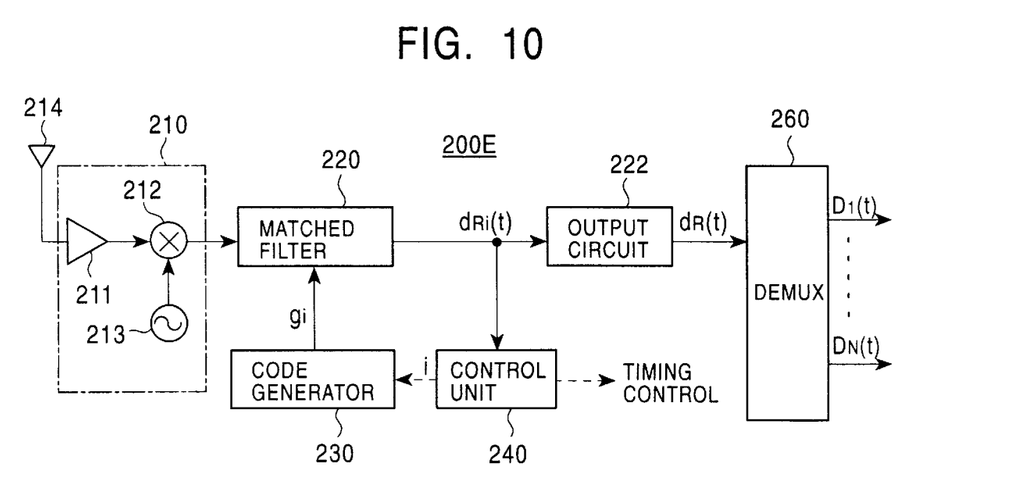
FIG. 10 is a block diagram illustrating the configuration of a receiver according to the sixth embodiment.

FIG. 10 in turn illustrates the configuration of a receiver (spread spectrum receiver) 200E according to the sixth embodiment, which is also installed both in a base station and in a mobile station. In FIG. 10, parts identical or corresponding to those in the aforementioned receiver 200 of the first embodiment illustrated in FIG. 2 are designated the same reference numerals.

Generally, the present invention is intended for application in a multi-code transmission scheme, so that the aforementioned first to fifth embodiments have illustrated transmitters and receivers which adopt the multi-code transmission scheme. More specifically, in these embodiments demultiplex transmitted data and utilize a plurality of code channels.

However, the technical idea of reducing the number of matched filters on the receiver side, which is the feature of the present invention, can be originally applied to a multiplex transmission scheme which transmits different types of data through a single radio channel in a multiplex manner. The sixth embodiment illustrates an application of the present invention to such a multiplex transmission scheme.

For the reason set forth above, in the sixth embodiment, the demultiplexer 110 for demultiplexing input data is not required in the transmitter 100E, and different types of data (having the same symbol period) is synchronously input to the transmitter 100E in parallel. The processing performed on the plural types of input data is similar to the first embodiment.

In the receiver 200E, on the other hand, the processing performed up to the output circuit 250 is similar to that of the first embodiment. The receiver 200E, however, requires a demultiplexer 260 succeeding to the output circuit 250 for demultiplexing an output signal of the output circuit 250 into data $D1(t)=d1(t), \ldots, DN(t)=dN(t)$ for each type of data.

The sixth embodiment has an advantage of simplifying the configuration of the receiver even when different types of data are multiplexed for transmission through a single radio channel.

(G) Other Embodiments

While the respective embodiments described above have referred to a variety of modified implementations of the present invention, further modified embodiments may be illustrated as follows.

The N or 2N number of data sequences into which input data is demultiplexed in the first to fifth embodiments may be previously determined before transmitting the data, or may be dynamically changed during the data communication. When the number of demultiplexed data sequences is dynamically changed, this may be notified through an associated control channel. Alternatively, the notification may be transmitted as part of reference data.

While in the respective embodiments described above, the configuration for giving phase differences to a plurality of channels is implemented by a group of delay units disposed behind a group of spreaders, the present invention is not limited to this particular configuration. Alternatively, for example, data and a spread code to each spreader may be delayed together to give phase differences to a plurality of channel signals.

Also, while in the respective embodiments described above, the reference channel signal is also included in the same radio channel signal in a similar manner to other channel signals related to data, the reference channel signal may be transmitted through a separate radio channel signal. If input data itself includes a synchronization pattern or the like, the transmission and reception of the reference channel signal may be eliminated.

Further, the present invention can be readily extended to the configuration of a RAKE receiver which constitutes a feature of the CDMA mobile communications system.

The transmitter and the receiver of the present invention may be implemented by hardware such as circuits composed of discrete parts, logic LSIs and so on as well as by software executable by a microprocessor.

While the respective embodiments described above illustrate applications of the present invention to a CDMA mobile communications system, the present invention may also be applied to a spread spectrum communications system of one-to-one configuration which does not require a multiple access scheme. The transmission path is not limited to a radio transmission path.

According to the present invention as described above, a plurality of spread channel signals are synthesized by shifting the phases of the spread channel signals by a time sufficiently shorter than one symbol period in a spread spectrum transmitter, while a plurality of spread code sequences, which are time-divided within one symbol period, are set one by one at a tap of a single matched filter to recover transmitted data in a spread spectrum receiver, so that the number of required matched filter can be largely reduced as compared with the prior art, thereby making it possible to significantly reduce the configuration associated with the reception.

The present invention has been described with reference to several preferred embodiments thereof. It should be understood by those skilled in the art that various modifications and changes can be made to the disclosed embodiments. It is therefore intended that such modifications and alterations are all encompassed in the scope of the accompanying claims.

What is claimed is:

1. A spread spectrum transmitter comprising:

spread code generating means for generating a plurality of spread codes simultaneously;

a plurality of spread means each for spreading data directed thereto within a plurality of parallel input data with one of said spread codes supplied thereto to form a channel signal;

interchannel phase difference forming means for delaying each of a plurality of channel signals by a predetermined delay time such that each of said plurality of channel signals has a phase difference that corresponds to said predetermined delay time and that a predetermined time period calculated by multiplying said predetermined delay time by the number of said plurality of channel signals is less than or equal to a single symbol period of a parallel input data; and combining means for combining said plurality of channel signals having the phase differences to form a transmission path channel signal.

2. A spread spectrum transmitter according to claim 1, further comprising reference channel signal inserting means for inserting a reference channel signal in said transmission path channel signal for providing timing information to a corresponding spread spectrum receiver.

3. A spread spectrum transmitter according to claim 2, wherein said reference channel signal inserting means provides said combining means, as said reference channel signal, with a reference spread code having a phase advanced by said unit time from the channel signal having the most advanced phase within said plurality of channel signals.

4. A spread spectrum transmitter according to claim 2, wherein said reference channel signal inserting means spreads reference data with a reference spread code to form a reference channel signal having a phase advanced by said unit time from the channel signal having the most advanced phase within said plurality of channel signals, and provides said combining means with said reference channel signal.

5. A spread spectrum transmitter according to claim 2, wherein said reference channel signal inserting means spreads reference data with a reference spread code to form a reference channel signal, and time-multiplexes the formed reference channel signal on a time base prior to an output signal from said combining means.

6. A spread spectrum transmitter according to any of claims 1 to 5, further comprising demultiplexer means before said plurality of spread means for demultiplexing one sequence of data into a plurality of data sequences and for providing each of said spread means with one of the demultiplexed data sequences.

7. A spread spectrum communications system comprising said spectrum transmitter according to claim 1 and a spread spectrum receiver comprising:

spread code generating means capable of generating a plurality of spread codes, said spread code generating means selectively outputting the generated spread codes;

single matched filter means having taps, wherein spread codes output from said spread code generating means are set within a single symbol period in a time-division manner at said taps, for outputting a correlation signal of a received transmission path channel signal with the spread codes set at said taps;

control means for sequentially switching said plurality of spread codes and setting a spread code at a tap of said matched filter means; and output means for recovering data transmitted from a corresponding spread spectrum transmitter, based on a sign of said correlation signal output from said matched filter means.

8. A spread spectrum receiver comprising:

spread code generating means capable of generating a plurality of spread codes, said spread code generating means selectively outputting the generated spread codes;

single matched filter means having taps, wherein spread codes output from said spread code generating means are set within a single symbol period in a time-division manner at said taps, for outputting a correlation signal of a received transmission path channel signal with the spread codes set at said taps;

control means for sequentially switching said plurality of spread codes and setting a spread code at a tap of said matched filter means; and output means for recovering data transmitted from a corresponding spread spectrum transmitter, based on a sign of said correlation signal output from said matched filter means.

9. A spread spectrum receiver according to claim 8, wherein said control means switches a spread code to be set at said tap of said matched filter when said control means detects that the power of the correlation signal output from said matched filter is equal to or larger than a threshold value.

10. A spread spectrum receiver according to claim 8, wherein said control means automatically switches a spread code to be set at said tap of said matched filter means every unit time, said unit time defining a phase difference given between channel signals related to respective transmitted data in said received transmission path channel signal.

11. A spread spectrum receiver according to any of claims 8 to 9, further comprising reference channel signal detecting means for detecting a reference channel signal included in said received transmission path channel signal and generating timing information.

12. A spread spectrum receiver according to claim 11, wherein said spread code generating means, said matched filter means and said control means function as said reference channel signal detecting means, and said control means outputs the timing information when said control means detects that the power in a correlation signal output from said matched filter means is equal to or larger than a threshold value in a state where a reference spread code is set at said tap of said matched filter means.

13. A spread spectrum transmitter comprising:

spread code generating means for generating spread codes simultaneously, said spread codes being different for each channel;

means for demultiplexing input data into a plurality of data sequences;

a plurality of spread means each for spreading one of said data sequences with a corresponding one of said spread codes and for forming a plurality of channel signals;

interchannel phase difference forming means for delaying each of said plurality of channel signals by a predetermined delay time such that each of said plurality of channel signals has a phase difference which corresponds to said predetermined delay time and that a predetermined time period calculated by multiplying said predetermined delay time by the number of said plurality of channel signals is less than or equal to a single symbol period of the demultiplexed data sequence; and combining means for combining said plurality of channel signals having the phase differences to form a transmission path channel signal.

* * * * *